United States Patent [19]
Fischer

[11] Patent Number: 5,205,689
[45] Date of Patent: Apr. 27, 1993

[54] EXPANSIBLE PLUG

[75] Inventor: Artur Fischer, Tumlingen, Fed. Rep. of Germany

[73] Assignee: fischerwerke Artur Fischer GmbH & Co. KG, Tumlingen, Fed. Rep. of Germany

[21] Appl. No.: 880,569

[22] Filed: May 8, 1992

[30] Foreign Application Priority Data

May 10, 1991 [DE] Fed. Rep. of Germany ....... 4115222

[51] Int. Cl.$^5$ .............................................. F16B 13/06
[52] U.S. Cl. ........................................ 411/54; 411/15; 411/44
[58] Field of Search ..................... 411/45, 54, 15, 60, 411/57, 29, 30, 31, 40, 41, 44

[56] References Cited

U.S. PATENT DOCUMENTS

| 751,902 | 2/1904 | Dodge | 411/15 |
|---|---|---|---|
| 1,438,648 | 12/1922 | Jacobs | 411/54 X |
| 1,746,326 | 2/1928 | Tomkinson | |
| 3,332,312 | 7/1967 | Bixby | 411/15 |
| 4,770,580 | 9/1988 | Fishcher | 411/54 X |

FOREIGN PATENT DOCUMENTS

| 2701804 | 7/1978 | Fed. Rep. of Germany | 411/54 |
|---|---|---|---|
| 3007650 | 9/1981 | Fed. Rep. of Germany | |
| 3117581 | 11/1982 | Fed. Rep. of Germany | 411/54 |
| 3633628 | 6/1988 | Fed. Rep. of Germany | |
| 3932729 | 4/1991 | Fed. Rep. of Germany | |

Primary Examiner—Rodney M. Lindsey
Attorney, Agent, or Firm—Michael J. Striker

[57] ABSTRACT

An expansible plug for anchoring in conical inwardly expanding drilled holes comprises multi-slotted expansion anchor having an inner opening with a cylindrical part, and an expander body having a bearing slope and a pin engaging in the inner opening of the expansion anchor, the inner opening of the expansion anchor having a front end provided with a funnel, a conically expanding first portion adjoining the funnel and a second portion having a length corresponding to the length of the first portion and reducing to a diameter of the inner opening. The bearing slope of the expander body rests in the funnel of the inner opening of the expansion anchor and is held by a peg clampingly engaging in the cylindrical part of the inner opening.

3 Claims, 1 Drawing Sheet

EXPANSIBLE PLUG

BACKGROUND OF THE INVENTION

The present invention relates to an expansible plug for anchoring in conically inwardly expanding drilled holes.

More particularly, it relates to such an expansible plug which has a multi-slotted expansive anchor having an inner opening and a mounting object, and an expander body arranged at the bottom of the drilled hole.

Expansible plugs of the above mentioned general type are known in the art. One of such expansible plugs is disclosed, for example, in the German document DE 3,117,581 A1. Here the expansible plug has a multi-slotted expansion anchor with an inner opening and an expander body which is held by a peg engaging in the inner opening in the front part of the expansion anchor. For anchoring the expansible plug is driven into a drilled hole of a concrete part provided with an undercut, until the expander body abuts against the bottom of the drilled hole. Since the total length of the expander body substantially corresponds to the length of the undercut of the drilled hole, the front end edge of the expansion anchor after its insertion into the drilled hole is located substantially at the height of the transition between the cylindrical part of the opening and the undercut. During driving-in of the expansion anchor the expansion segments are pressed radially outwardly by the expander body so that a substantial friction and clamping of the expansion segments at the transition edge from the cylindrical portion of the drilled hole to the undercut occurs. This leads to an increase of the impact energy and to a breakage of the drilled hole in the region of the transition edge. Therefore both the slipping properties of the plug and also its pull-out value are adversely affected.

SUMMARY OF THE INVENTION

Accordingly, it is an object of the present invention to provide an expansible plug which avoids the disadvantages of the prior art.

More particularly, it is an object of the present invention to provide an expansible plug which can be anchored with a lower driving-in energy and can provide high pull-out forces with favorable slipping properties.

In keeping with these objects and with others which will become apparent hereinafter, one feature of the present invention resides, briefly stated, in an expansible plug in which the inner opening of the expansion anchor has a funnel extending from its front end, a conically extending first portion adjoining the funnel and a second portion of a substantially the same length and also expanding to the diameter of the inner opening, the expander body rests with its bearing slope in the funnel and is held by a peg which clampingly engages in the cylindrical portion of the inner opening.

When the plug is designed in accordance with the present invention it eliminates the disadvantages of the prior art and provides for the above mentioned highly advantageous results.

Due to the funnel extending from the front end of the inner opening of the expansion anchor, torsion is produced which receives the bearing slope of the expander body and reduces the projection of the expander body beyond the end side of the expansion anchor before the mounting. Simultaneously, the funnel with the bearing slope of the expander body form a sliding surface which assists in the driving of the expansion anchor onto the expander body.

The expansion anchor is driven onto the expander body until the expanding first portion rests on the supporting surface of the expander body. Since this portion corresponds to substantially half length of the expansion segments, an expander body with shorter supporting surface can be used. A further reduction of the projection is provided so that the expansion anchor before anchoring is insertable into a drilled hole so far that the end edge of the expansion anchor far into the undercut. The hinge point, which for example for the expansion segments which is formed, for example, by a circular groove thereby is located near the transition edge from the cylindrical portion of the drilled hole in the undercut before the beginning of anchoring so that considerably lower friction and clamping occurs at the transition edge. The reduction of the clamping is also promoted in that the expansion segments can be bent by their cross-sectional weakening at the edge with both portions impacting one another.

Because of the reduction of the impact energy and shortening of the expansion path the inventive expansion anchor can be anchored with a few hammer blows.

Because of the unsupported part of the expansion segments directly adjoining the hinge, a large degree of flexibility is obtained which leads to an optimal abutment of the expansion segments against the wall of the undercut of the drilled hole. Since the transition edge remains largely undamaged, high pull-out values with very low slipping properties of the expansible plug are obtained.

When a tensile force is applied to the expansion anchor, the expansion segments are pressed through the undercut of the drilled hole against the surface of the expander body. The pressing force which increases with an increasing tensile load prevents pull-out of the anchor from the expander body. A further increase of the pressing force is obtained when the supporting surface of the expander body is formed with a slight taper towards the front end.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
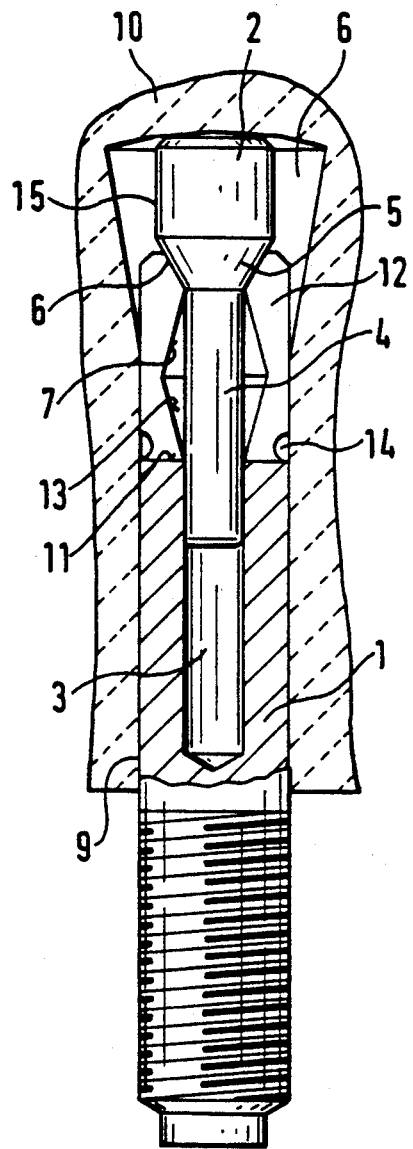
FIG. 1 is a view showing an expansible plug in accordance with the present invention which is inserted in a drilled hole in masonry and shown in its unexpanded state.
Figure 2:
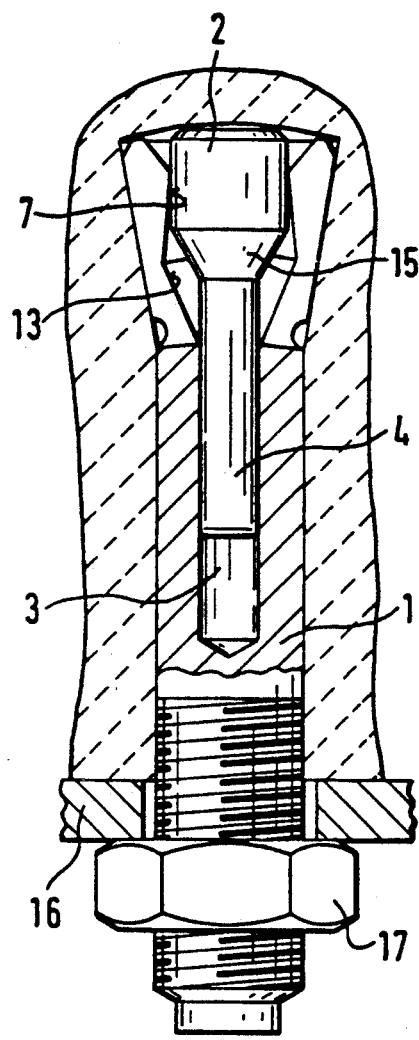
FIG. 2 is a view showing the expansible plug of FIG. 1 in its expanded state.

An expansible plug in accordance with the present invention has an expansion anchor which is identified as a whole with reference numeral 1 and an expander body which is identified with reference numeral 2. The expansion anchor 1 has an inner opening 3, and an expander body 2 has a pin 4 which extends through the inner opening 3 and connects the expansion anchor 1 and the expander body 2 with one another to form a mounting unit. The inner opening 3 of the expansion anchor has a funnel 6. The expander body 2 has a bearing slope 5 which rests in the funnel 6 of the inner opening 3. A portion 7 adjoins the funnel 6 and is conically expanded to form expansion surfaces. The cone angle of the portion 7 substantially corresponds to the angle of an undercut 8 of a drilled hole 9 in masonry 10. Each anchor has a plurality of slots 11 which form expansion segments 3.

At the half length of the expansion segments 12 a reducing portion 13 is formed in the portion 7. A circular ring groove 14 is provided at the transition from the portion 13 to the inner opening 3 on the peripheral surface of the expansion anchor 1. The groove 14 reduces the cross-section at this location and forms a hinge for the expansion segments 12.

The length of the bearing surface 15 of the expander body 2 substantially corresponds to the length of the portion 7 and therefore substantially correspond to the half length of the expansion segments 12. Thereby the projection of the expander body beyond the end side of the expansion anchor 1 is relatively small. When the expander body 2 rests at the bottom of the drilled hole 9, the expansion segments 12 extend far into the undercut 8 of the drilled hole 9. The anchoring of the expansion anchor is performed by hammer impacts against the end side of the expansion anchor. The expansion segments 12 slide on the bearing slope 5 of the expander body 2 and on its bearing surface 15, until the end side of the expansion anchor abuts against the bottom of the drilled hole. Expansion segments 12 completely abut against the wall of the undercut 8 and are simultaneously supported by the abutment of the portion 7 against the slightly narrowing bearing surface 15 of the expansion anchor. During the driving-in operation the peg 4 penetrates into the inner opening 3 of the expansion anchor. For mounting an object 6 the anchor is provided with a thread and a nut 17 is screwed on the thread.

Portions 7 and 13 of the inner opening 3 of the expansion anchor 1 can be produced with proper sizes by being bored out on an automatic lathe. Since the expansion anchor has small diameters it is therefore advantageous to provide a cylindrical opening extending from the insertion end face, and to make the slots. After this the expansion anchor 1 is somewhat expanded approximately to the dimension of the undercut 8 of the drilled hole 9. Expansion anchor 1 is drilled with a stepped drill bit from the insertion end to form the portions 7 and 13. By compressing the expansion segments 12 to the original dimension the desired contour of the inner opening is produced.

It will be understood that each of the elements described above, or two or more together, may also find a useful application in other types of constructions differing from the types described above.

While the invention has been illustrated and described as embodied in an expansible plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An expansible plug for anchoring in conical inwardly expanding drilled holes, comprising a multi-slotted expansion anchor having an inner opening with a cylindrical part; and an expander body having a bearing slope and a pin engaging in said inner opening of said expansion anchor, said inner opening of said expansion anchor having a front end provided with a funnel, a conically expanding first portion adjoining said funnel and a second portion having a length corresponding to the length of said first portion and reducing to a diameter of said inner opening, said bearing slope of said expander body resting in said funnel of said inner opening of said expansion anchor and being held by said pin clampingly engaging in said cylindrical part of said inner opening.

2. An expansible plug as defined in claim 1, wherein said expansion anchor is provided with means for mounting an object on said expansion anchor.

3. An expansible plug for anchoring in conical inwardly expanding drilled holes, comprising a multi-slotted expansion anchor having an inner opening with a cylindrical part; and an expander body having front and rear ends, a pin extending toward said rear end and engaging in said inner opening of said expansion anchor, a bearing surface narrowing toward said front end and a bearing slope located between said pin and said bearing surface, said inner opening of said expansion anchor having a front end provided with a funnel, a conically expanding first portion adjoining said funnel and a second portion having a length corresponding to the length of said first portion and reducing to a diameter of said inner opening, said expander body resting with said bearing slope in said funnel of said inner opening of said expansion anchor and being held by said pin clampingly engaging in said cylindrical part of said inner opening.

* * * * *